United States Patent [19]

Gill

[11] Patent Number: 4,645,628

[45] Date of Patent: Feb. 24, 1987

[54] PRODUCTION OF OPTICAL CABLE

[75] Inventor: Ronald Y. Gill, Essex, England

[73] Assignee: Telephone Cables Limited, England

[21] Appl. No.: 760,674

[22] Filed: Jul. 30, 1985

[30] Foreign Application Priority Data

Aug. 2, 1984 [GB] United Kingdom ............... 8419751

[51] Int. Cl.$^4$ .................. B29D 11/00; H01B 11/22
[52] U.S. Cl. .................... 264/1.4; 29/825;
156/48; 156/51; 156/56; 264/1.5; 264/174;
264/285; 425/113; 425/391
[58] Field of Search ............ 264/1.4, 1.5, 167, 174,
264/285, 146; 156/56, 48, 51; 29/825; 425/113,
391, 174.8 R

[56] References Cited

U.S. PATENT DOCUMENTS

| | | | |
|---|---|---|---|
| 4,205,899 | 6/1980 | King et al. | 264/1.5 |
| 4,378,462 | 3/1983 | Arnold et al. | 156/56 |
| 4,474,426 | 10/1984 | Yataki | 264/1.5 |
| 4,528,148 | 7/1985 | Dotti | 264/1.5 |
| 4,548,567 | 10/1985 | Missont | 264/284 |

Primary Examiner—James Lowe
Attorney, Agent, or Firm—Kirschstein, Kirschstein, Ottinger & Israel

[57] ABSTRACT

In the production of an optical fibre cable a core (3) of thermoplastics material is extruded with a plurality of longitudinally-extending grooves (15) in its outer surface around an electrical conductor (1) and is initially cooled: then following the introduction of one or more fibres (11) in at least one of the grooves the core assembly is passed through an induction heating unit (17) in which the conductor is heated to an extent sufficient to soften at least the adjoining region of the core, and the core is twisted to cause the grooves to take up a helical or periodically reversing helical path, and is again cooled to leave the grooves in that condition.

9 Claims, 2 Drawing Figures

PRODUCTION OF OPTICAL CABLE

BACKGROUND OF THE INVENTION

This invention relates to processes and apparatus for the production of optical cables, that is to say cables incorporating one or more optical fibres within a protective cover, and relates especially to the production of such cables which are of the kind incorporating an extruded core of thermoplastics material having series of longitudinally extending channels, at least one of which accommodates one or more of said optical fibres, the core being surrounded in the completed cable, by an outer sheath.

Commonly the channels extend in a helical manner about the core axis, either in the form of a continuous helix or one in which the pitch of the helix is periodically reversed, the fibre or fibres being loosely accommodated within the respective channel or channels, which may either be completely closed or be formed as grooves in the periphery of the core. Hitherto the formation of the helical channels in the core has been effected by twisting the core while it is still in a softened condition after leaving the extruder, but in the case where the channels are provided by grooves in the periphery of the core this can give rise to difficulties in introducing the fibres into the grooves at some subsequent stage of manufacture.

SUMMARY OF THE INVENTION

One object of the present invention is to provide a process for the production of optical cables which avoids this difficulty, and which has other advantages as will be apparent from the following description.

In accordance with the invention, in a process for the production of an optical cable of the kind referred to, the core is extruded around at least one elongated electrical conductor and is initially cooled, and, with the optical fibres within the respective channel or channels, the core is passed through an induction heating unit arranged to heat said conductor by an amount sufficient to soften at least the adjoining region of the surrounding core, the core is twisted to cause the channels to take up a helical or periodically reversing helical path, and is again cooled to leave said channels extending in a helical manner about the core axis.

The cable can be completed by subsequently surrounding the core by one or more outer coverings in known manner, either as part of a continuous process or as a completely separate operation.

In the case where the channels are provided by grooves in the periphery of the core, the fibre or fibres may be introduced into the respective groove or grooves prior to the passage of the core through the induction heating unit, i.e. while the grooves are still straight, thereby avoiding the difficulty of introducing feeding fibres into helically extending grooves.

The grooves may be formed in the core by the extrusion process, or alternatively the core may be extruded with closed channels and the grooves formed by slitting the outer wall of core to provide access to the channels. In addition to the optical fibre or fibres, at least one of the grooves may accommodate one or more electrical conductors.

The invention has the further advantage that the expansion of the central conductor as it is heated produces an elongation of the surrounding core, causing the fibre or fibres to be pulled at an appropriate rate into the respective channel or channels. Then, when the conductor and core contract on subsequent cooling, it results in the fibre or fibres taking up a meandering path within the respective channel or channels, due to the fibre length then becoming greater than the channel length, thereby reducing the risk of damage to the fibre or fibres when the cable is bent or tensile loads applied to it, either in use or during subsequent manufacturing processes.

In some cases the core may comprise an inner layer of a first thermoplastics material immediately surrounding the conductor, and surrounded, in turn, by an outer externally grooved layer, of a second thermoplastics material having a relatively higher melting point than the first. The heating of the conductor then need only be sufficient to soften the material of the inner layer, thereby allowing the outer layer to be twisted without itself being subjected to softening, the subsequent cooling and hardening of the inner layer holding the outer layer in the twisted condition.

A jelly-like or powdered substance having water-repellent properties, may be introduced into the channel or channels containing one or more optical fibres, the substance being such as to permit a degree of movement of the fibre or fibres as the cable is bent.

BRIEF DESCRIPTION OF THE DRAWINGS

One process in accordance with the invention, and a modification thereof, will now be described by way of example with reference to FIGS. 1 and 2 of the accompanying schematic drawings, in which.

DETAILED DESCRIPTION OF THE PREFERRED EMBODIMENTS

Figure 1:
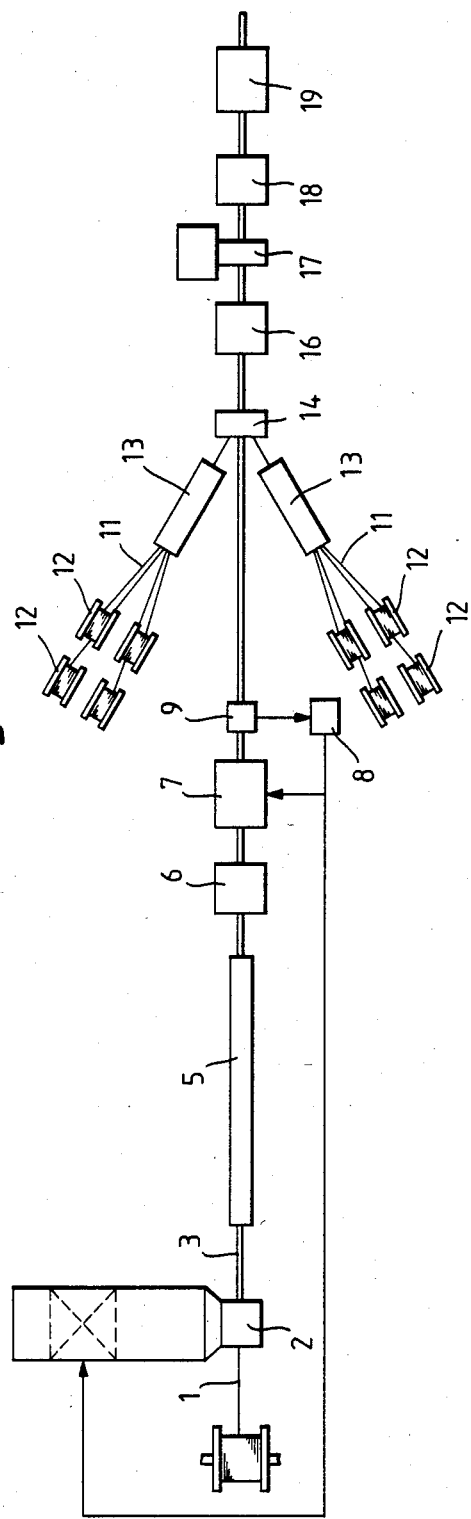
FIG. 1 shows, in diagrammatic form, apparatus for carrying out the process.
Figure 2:
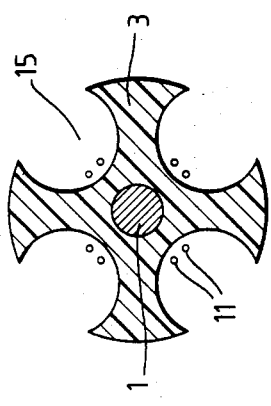
FIG. 2 illustrates the cross-section of one form of cable core for the reception of optical fibres, in carrying out the process.

Referring first to FIG. 1, a stranded steel strength member 1 is pulled from a drum 10 through an extruder head 2 which deposits around the strength member a core 3 of thermoplastics material such as polypropylene, the extruder head 2 being equipped with tooling to produce a multi-grooved plastic section, for example as shown in FIG. 2.

The core assembly, comprising the plastic core section 3, with the embedded strength member 1, is then passed through a cooling trough 5 of a length sufficient to harden the thermoplastics material, and is subsequently passed through a dryer 6 to remove water therefrom.

The core assembly then passes to a capstan 7 which is arranged to draw assembly from the extruder, and whose speed is linked to that of the extruder scroll, both being controlled by a control unit 8 in response to signals from a diameter sensing device 9.

A plurality of optical fibres 11 are drawn from reels 12 through multi-head fibre colouring and drying units 13 and are fed by suitable guide means, shown diagrammatically at 14, into the axially extending grooves 15 in the core section which is secured against rotation at this position.

The core assembly, now accommodating the optical fibres 11, then passes to a cotton whipping head 16 which applies a helical open lay binding (not shown)

around the assembly for retaining the optical fibres 11 within the respective grooves 15.

The assembly then passes through an induction heating unit 17 which is suitably controlled to heat the central steel strength member 1 sufficiently to soften the thermoplastics material of the core 3. From the induction heating unit 17 the assembly passes to a unit 18 which is arranged to grip the core 3, and apply an oscillatory motion to it about the core axis, thus imparting to the plastic core 3, around the steel strength member, and hence to the grooves 15 and fibres 11, a periodically reversing helical lay.

At a distance from the induction heater sufficient only to allow the softened plastic of the core 3 to harden, the cable is wound around a large diameter capstan unit 19 driven at a rate sufficient to apply tension to the core assembly.

The core assembly, being wound around the capstan unit 19 in an expanded lengthwise form, due to the temperature rise imparted to it by the induction heating unit 17, provides a pulling force on the optical fibres and thus the length of the fibres pulled into the cable corresponds to the expanded cable length, the fibres taking the shortest path; i.e. to the bottom of the groove 15. The number of turns of the cable around the capstan unit 19 is sufficient to ensure that the steel strength member 1, has returned to ambient temperature before leaving the unit. Then, as the steel strength member with the plastic core contracts, the optical fibres will move to a new path away from the bottom of the grooves, the fibres then having a length greater than that of the grooves 15 in which they are accommodated.

Manufacture of the cable may be completed, either as a continuation of the process or as a separate process, by enclosing the core assembly by one or more outer coverings. For example a water impervious metal tape may be folded longitudinally around the core assembly, or wrapped helically around it, and an outer sheath of plastics material extruded around the tape.

In a modification of the process above described, a first relatively thin coating of thermoplastics material is extruded directly onto the steel strength member 1, and this has applied to it in turn a second, relatively thicker coating of thermoplastics material having a higher softening temperature, grooves being formed in the outer surface of the coating. The induction heating unit is controlled so that as the core assembly passes through it the inner coating of thermoplastics material softens without significantly softening the outer casing. Then the oscillating unit will produce an oscillating rotation of the grooved outer plastic coating, which will remain in the twisted condition on solidification of the inner coating when the latter is subsequently cooled.

Instead of the core, or outer coating, as the case may be, being extruded with grooves formed by the extrusion process, the core or coating may be extruded with completely closed channels, and the grooves formed subsequently by cutting away strips of the outer wall along the central region of each of the channels.

Furthermore the invention could also find use in the manufacture of cables in which the core is formed with closed channels for accommodating one or more optical fibres, the fibre or fibres in such a case being introduced into the respective channel or channels during the extrusion process.

The invention includes within its scope apparatus comprising an induction heating unit for heating a central conductor of a thermoplastics core of a cable of the kind referred to, to an extent sufficient to soften at least the adjoining region of the core material, and means for twisting the core emerging from the unit to cause the channels to take up a helical or periodically reversing helical path, and for supporting the core in the twisted condition until the softened core material has subsequently solidified.

The apparatus may also be used to advantage for effecting an over-feed of fibres into core grooves already having a continuous or oscillating helical lay, the induction heating and consequent expansion of the central conductor causing the fibres to be drawn into the grooves at a rate such that on subsequent cooling and contraction of the core the fibres have a length greater than the length of the channels in which they are accommodated.

I claim:

1. A process for use in the production of an optical cable of the kind having a core of thermoplastics material which is extruded around at least one elongated electrical conductor and has a series of longitudinally extending channels at least one of which accommodates one of more optical fibres, characterised by the steps of:
   (i) cooling the core following the extrusion process;
   (ii) introducing the optical fibre or fibres within the respective channel or channels;
   (iii) passing the core with the optical fibres contained within the channel or channels through an induction heating unit which is energized so as to heat said conductor by an amount sufficient to soften at least the adjoining region of the surrounding core;
   (iv) subsequently twisting the core to cause the channels and the optical fibres contained therein to take up a helical or periodically reversing helical path; and
   (v) cooling the core once more to leave said channels extending in a helical manner about the core axis.

2. A process according to claim 1 wherein the channels are provided by grooves formed in the periphery of the core.

3. A process according to claim 2 wherein the grooves are formed in the core during the extrusion process.

4. A process according to claim 2 wherein the core is initially formed with closed channels and the grooves are formed by slitting the wall to provide access to the channels.

5. A process according to claim 2 wherein the core comprises an inner layer of a first thermoplastics material immediately surrounding the conductor, and surrounded, in turn, by an outer externally grooved layer, of a second thermoplastics material having a relatively higher melting point than the first.

6. A process according to claim 5 wherein the heating of the conductor is sufficient to soften the inner layer only, thereby allowing the outer layer to be twisted without itself being subjected to softening, the subsequent cooling and hardening of the inner layer holding the outer layer in the twisted condition.

7. A process according to claim 1 wherein a jelly-like or powdered substance having water-repellent or water-blocking properties is introduced into the channel or channels containing one or more optical fibres, the substance being such as to permit a degree of movement of the fibre or fibres as the cable is bent.

8. A process according to claim 2 wherein the core is subsequently surrounded by one or more outer coverings.

9. A process according to claim 8 wherein a water-impervious metal tape is folded longitudinally around the core or is wrapped helically around it, and an outer sheath of plastics material is extruded around the tape.

* * * * *